June 16, 1925.
C. A. NERACHER
1,541,993
THIRD WHEEL ATTACHMENT FOR MOTOR CYCLES
Filed June 13, 1921   2 Sheets-Sheet 2
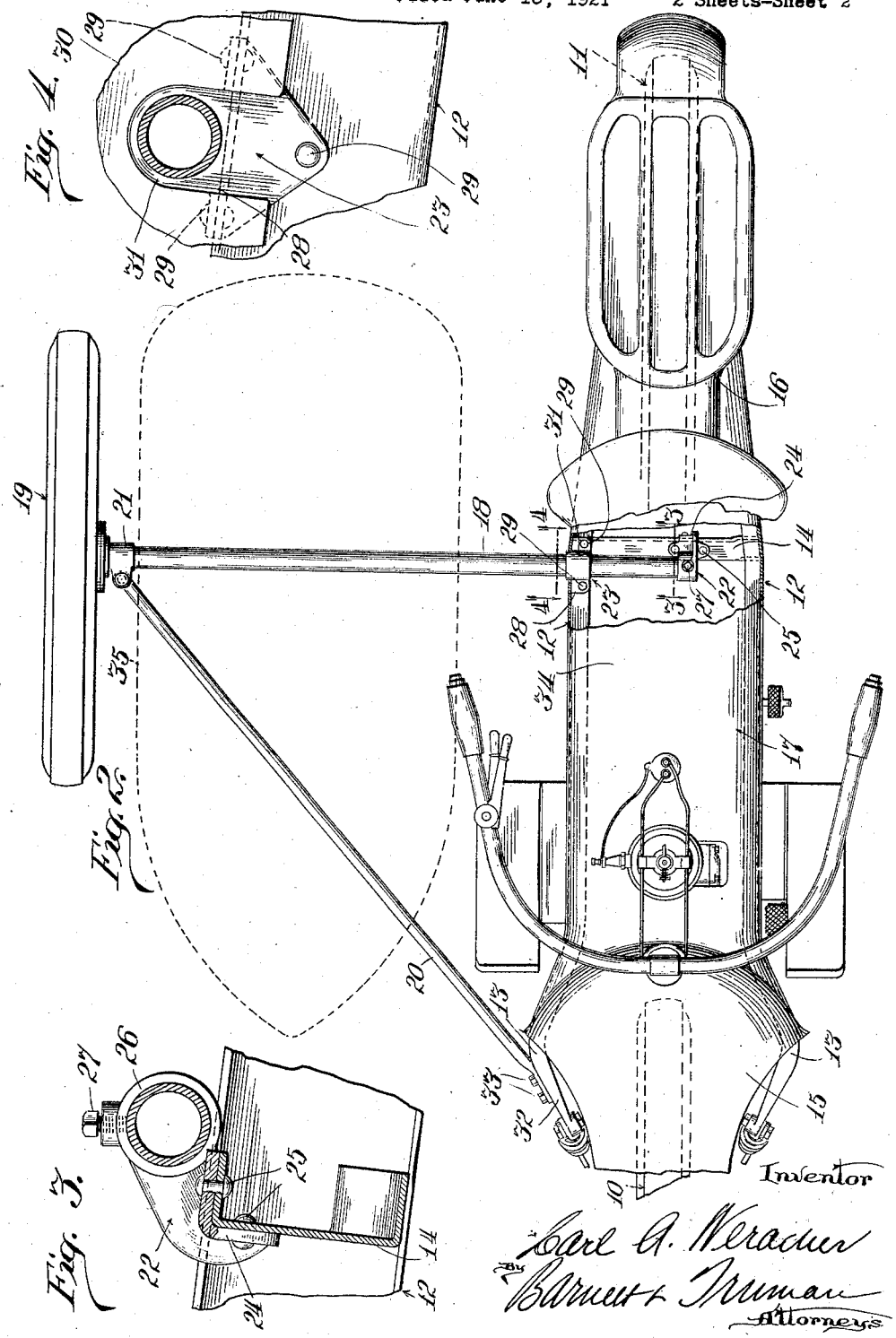

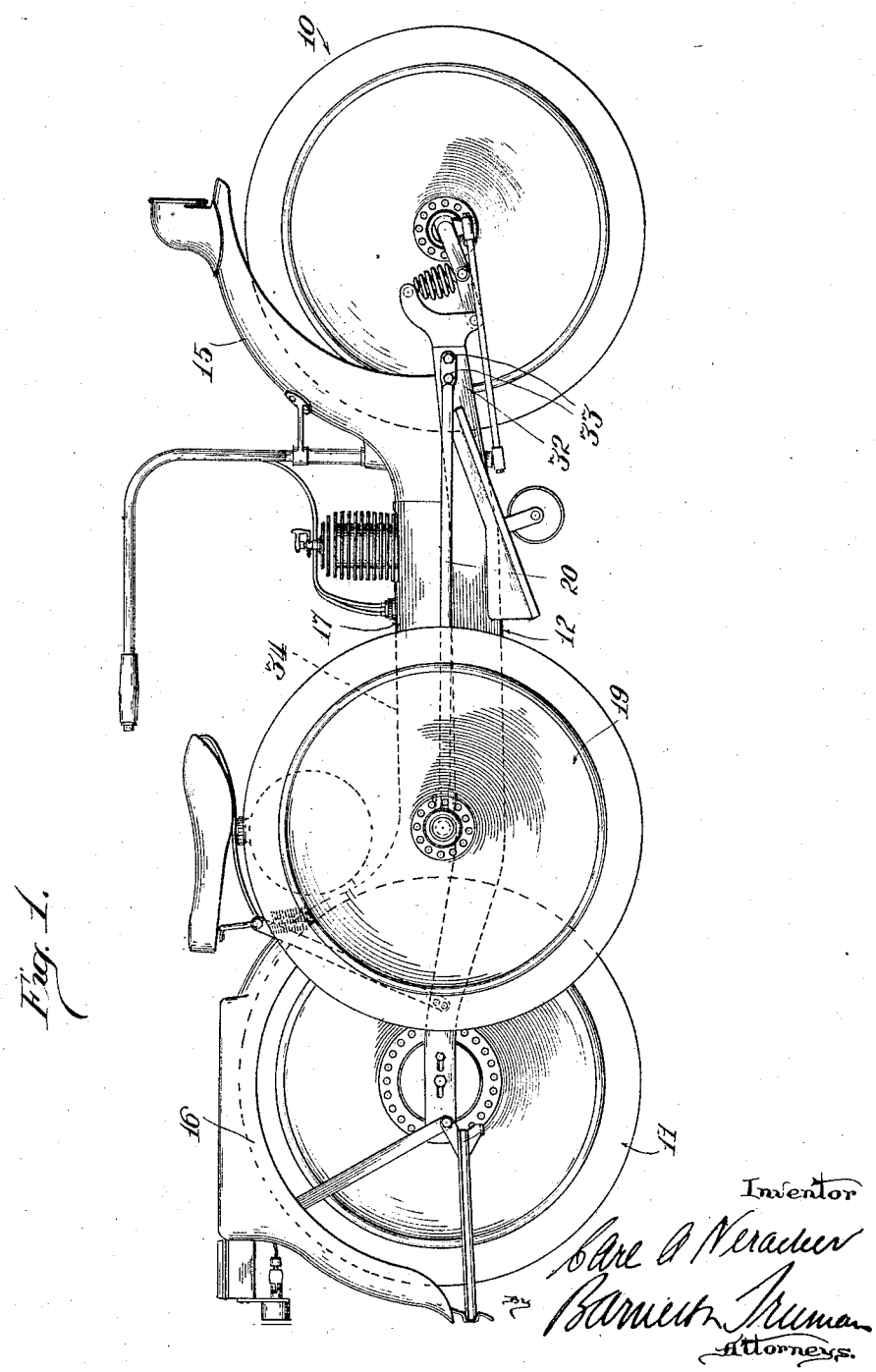

Patented June 16, 1925.

1,541,993

UNITED STATES PATENT OFFICE.

CARL A. NERACHER, OF SYRACUSE, NEW YORK, ASSIGNOR TO NER-A-CAR CORPORATION, A CORPORATION OF NEW YORK.

THIRD-WHEEL ATTACHMENT FOR MOTOR CYCLES.

Application filed June 13, 1921. Serial No. 477,148.

*To all whom it may concern:*

Be it known that I, CARL A. NERACHER, a citizen of the United States, residing at Syracuse, in the county of Onondaga and State of New York, have invented certain new and useful Improvements in a Third-Wheel Attachment for Motor Cycles, of which the following is a specification.

My invention relates to motorcycles, and more especially to a motorcycle of the two wheeled type as shown in my copending application Serial No. 480,770 filed June 27, 1921 having a frame which is substantially horizontal, is located substantially at the wheel centers and at the center portion of the vehicle is in the form of a hollow housing to enclose the driving mechanism of the motorcycle or the principal parts thereof.

This invention has for its primary object to provide a third wheel attachment for a two wheeled motorcycle, especially for a motorcycle of the type indicated, consisting of a wheel and a frame or support for the same, which may be quickly and conveniently attached to and detached from the motorcycle as occasion may require. The third wheel attachment may be employed merely as means for stabilizing the motorcycle or it may be used for supporting a side car seat, delivery box or the like.

The invention is illustrated, in a preferred embodiment, in the accompanying drawings which show the third wheel attachment in connection with a motorcycle of the type mentioned. In the drawings, Fig. 1 is a side elevation of the motorcycle and third wheel attachment.

Fig. 2 is a fragmentary plan view of the same, and

Figs. 3 and 4 are sectional views on lines 3—3 and 4—4 of Fig. 2, the scale being somewhat enlarged.

Referring to the drawings, 10 designates the front wheel of the motorcycle and 11 the rear wheel. The frame of the machine comprises a pair of side frame members 12, 12 which are bowed outwardly near their forward extremities, as indicated at 13, and suitable cross members connecting the side frames, the rear cross frame member being shown at 14 and consisting of a channel bar, the ends of which are set into and secured to the side frame members which are also preferably channel-shaped in cross section. 15 is the front mud-guard, 16 the rear mud-guard and 17 a hollow housing for the driving mechanism of the motorcycle, which housing is unitary with and forms part of the frame of the machine.

The third wheel attachment constituting the subject matter of my present invention comprises an axle member 18, wheel 19 mounted thereon, and a diagonal strut 20 pivoted to a collar 21 on the axle. The axle is preferably tubular and is adapted to be attached to the motorcycle frame by means of a pair of attaching devices 22, 23 formed with bosses to receive the axle. The inner attaching member 22 is in the form of a socket and is provided with an angular bracket 24 which is secured by rivets 25, 25 to the web and upper flange of the cross brace 14 (Fig. 3). The socket 26 of member 22 is provided with a set screw 27 to engage the axle.

The other attaching member 23 is in the form of a sleeve provided with an angular bracket 28 secured by rivets 29, 29 to the web and upper flange of one of the side frame members 12 (Fig. 4). The sheathing 30 of the housing 17 is cut away to expose the opening into the boss portion 31 of attaching member 23. The diagonal strut or brace 20 is arranged so that its outer end lies flatwise against one of the converging portions 32 of the frame to which it is secured in any suitable manner, for example, by bolts 33.

The housing 17 comprises an upper section 34 which may be removed for manipulation of set screw 27 in attaching and detaching axle 18 from the frame.

The other parts of the motorcycle shown in the drawings have no concern with my present invention and need not be described.

It will be seen that the third wheel attachment will be conveniently and quickly attached to or detached from the motorcycle. The arrangement is such that the axis of wheel 19 is in the same plane with the axes of the front and rear wheels of the motorcycle. The members 18 and 20 provide a frame for supporting a box or side car. The outline of the side car is indicated by the dotted lines 35 in Fig. 2.

I claim:

1. In combination with the frame of a two-wheeled motorcycle, comprising side frame members on opposite sides of the wheels of the motorcycle and a transverse frame member, a third wheel attachment for the motorcycle comprising an axle, a wheel mounted thereon, and means for detachably fastening the axle to said frame at two places spaced transversely apart thereon.

2. In combination with the frame of a two-wheeled motorcycle comprising side frame members on opposite sides of the wheels of the motorcycle and a transverse frame member near the rear end of the frame, and a third wheel attachment for the motorcycle comprising an axle, a wheel mounted thereon, means for detachably fastening the axle to said frame at two places spaced transversely apart thereon, and a diagonal brace extending from the outer end of said axle to the forward end of one of said side frame members and provided with means for removably attaching it to one of said side frame members.

3. In combination with the frame of a two-wheeled motorcycle comprising side frame members on opposite sides of the wheels of the motorcycle having forwardly converging portions and a transverse frame member near the rear end of the frame, a third wheel attachment for the motorcycle comprising an axle, a wheel mounted thereon, means for detachably fastening the axle to said frame at two places spaced transversely apart thereon, a diagonal brace extending from the outer end of said axle and overlapping the converging portion of one of said side frame members, and means for attaching said diagonal brace to said member.

4. In combination with the frame of a two-wheeled motorcycle comprising side frame members on opposite sides of the wheels of the motorcycle and a transverse frame member, a third wheel attachment for the motorcycle comprising an axle, a wheel mounted thereon, and two spaced engaging devices one on one of said frame members and the other on said transverse frame member with which said axle is adapted to be detachably engaged.

5. In combination with the frame of a two-wheeled motorcycle comprising side frame members on opposite sides of the wheels of the motorcycle and a transverse frame member, a third wheel attachment for the motorcycle comprising an axle, a wheel mounted thereon, bosses spaced apart transversely on the frame which receive the axle, and means for anchoring the axle to one of said bosses.

6. In combination with the frame of a two-wheeled motorcycle comprising side frame members on opposite sides of the wheels of the motorcycle, a third wheel attachment for the motorcycle comprising an axle, a wheel mounted thereon, two engaging devices spaced transversely on said frame with which said axle is adapted to be detachably engaged.

7. In combination with a two-wheeled motorcycle having a substantially horizontal frame at approximately the level of the wheel centers comprising members on opposite sides of the wheels of the motorcycle, a third wheel attachment comprising an axle, one end of which is adapted to extend across said frame in front of the rear wheel of the motorcycle, a wheel mounted on the outer end of said axle, and means for detachably engaging the inner end of the axle with the frame at points transversely thereof.

8. In combination with a two-wheeled motorcycle having a substantially horizontal frame at approximately the level of the wheel centers comprising members on opposite sides of the wheels of the motorcycle, a third wheel attachment comprising an axle, one end of which is adapted to extend across said frame in front of the rear wheel of the motorcycle, a wheel mounted on the outer end of said axle, and means for detachably engaging the inner end of the axle with the frame comprising a transversely arranged sleeve on said frame through which said axle projects.

9. In combination with a two-wheeled motorcycle having a substantially horizontal frame at approximately the level of the wheel centers comprising members on opposite sides of the wheels of the motorcycle, a third wheel attachment comprising an axle, one end of which is adapted to extend across said frame in front of the rear wheel of the motorcycle, a wheel mounted on the outer end of said axle, means for detachably engaging the inner end of the axle with the frame comprising a transversely arranged sleeve on said frame through which said axle projects, and a socket on said frame inwardly of said sleeve to receive the inner extremity of the axle.

10. In combination with a two-wheeled motorcycle having a substantially horizontal frame at approximately the level of the wheel centers comprising side frame members on opposite sides of the wheels of the motorcycle, a third wheel attachment comprising an axle, a wheel on the outer end of said axle, and means for detachably securing the inner end of said axle to said frame at one of said side frame members and at a place adjacent the other of said members.

11. In combination with a two-wheeled motorcycle having a substantially horizontal frame at approximately the level of the wheel centers comprising side frame members on opposite sides of the wheels of the motorcycle, a third wheel attachment comprising an axle, a wheel on the outer end of said axle, and means for detachably securing the inner end of said axle to said frame at one of said side frame members and at a place adjacent the other of said members comprising a transversely arranged sleeve through which said axle projects.

12. In combination with a two-wheeled motorcycle having a substantially horizontal frame at approximately the level of the wheel centers comprising side frame members on opposite sides of the wheels of the motorcycle, a third wheel attachment comprising an axle, a wheel on the outer end of said axle, means for detachably securing the inner end of said axle to said frame at one of said side frame members and at a place adjacent the other of said members comprising a transversely arranged sleeve through which said axle projects, and a socket to receive the inner extremity of said axle.

13. In combination with a two-wheeled motorcycle having a substantially horizontal frame at approximately the level of the wheel centers comprising side frame members on opposite sides of the wheels of the motorcycle, a third wheel attachment comprising a wheel and a frame structure therefor having a transverse member adapted to extend across said motorcycle frame in front of the rear wheel thereof, and means for detachably engaging the end of said transverse member with the motorcycle frame at points transversely thereof.

14. In combination with a two-wheeled motorcycle having a substantially horizontal frame at approximately the level of the wheel centers comprising side frame members on opposite sides of the wheels of the motorcycle, a third wheel attachment comprising a wheel and a frame structure therefor having a transverse member adapted to extend across said motorcycle frame in front of the rear wheel thereof, means for detachably engaging the end of said transverse member with the motorcycle frame at points transversely thereof, and a diagonally extending member detachably engageable with the forward part of the motorcycle frame.

15. In combination with a two-wheeled motorcycle having a substantially horizontal frame at approximately the level of the wheel centers, comprising side frame members on opposite sides of the wheels of the motorcycle, a third wheel attachment comprising a wheel and a frame structure therefor having a transverse member adapted to extend across said motorcycle frame in front of the rear wheel thereof, and means for detachably engaging the end of said transverse member with the motorcycle frame at points transversely thereof, comprising a sleeve on one of the side members of the motorcycle frame.

16. In combination with a two-wheeled motorcycle having a substantially horizontal frame at approximately the level of the wheel centers, comprising side frame members on opposite sides of the wheels of the motorcycle, a third wheel attachment comprising a wheel and a frame structure therefor having a transverse member adapted to extend across said motorcycle frame in front of the rear wheel thereof, means for detachably engaging the end of said transverse member with the motorcycle frame at points transversely thereof comprising a sleeve on one of the side members of the motorcycle frame, and a diagonally extending member detachably engageable with the forward part of the motorcycle frame.

17. In combination with a two-wheeled motorcycle having a substantially horizontal frame at approximately the level of the wheel centers comprising side frame members on opposite sides of the wheels of the motorcycle, a third wheel attachment comprising a wheel and a frame structure therefor having a transverse member adapted to extend across said motorcycle frame in front of the rear wheel thereof, and means for detachably securing the inner end of said transverse member to the motorcycle frame at one of said side frame members and at a place adjacent the other of said side frame members.

18. In combination with a two-wheeled motorcycle having a substantially horizontal frame at approximately the level of the wheel centers comprising side frame members on opposite sides of the wheels of the motorcycle, a third wheel attachment comprising a wheel and a frame structure therefor having a transverse member adapted to extend across said motorcycle frame in front of the rear wheel thereof, means for detachably securing the inner end of said transverse member to the motorcycle frame at one of said side frame members and at a place adjacent the other of said side frame members, and a diagonally extending member detachably engageable with the forward part of the motorcycle frame.

CARL A. NERACHER.